United States Patent [19]
Reed

[11] Patent Number: 5,477,848
[45] Date of Patent: Dec. 26, 1995

[54] SOLAR COLLECTOR EXPANSION ASSEMBLY

[76] Inventor: Peter D. Reed, 2115 W. Royal Palm Rd., Apt 1048, Phoenix, Ariz. 85021

[21] Appl. No.: 309,098

[22] Filed: Sep. 20, 1994

[51] Int. Cl.⁶ ........................................ F24J 2/24
[52] U.S. Cl. .................... 126/659; 126/670; 165/171
[58] Field of Search .................... 126/659, 661, 126/660, 662, 658, 670, 663; 165/171

[56] References Cited

U.S. PATENT DOCUMENTS

| | | | |
|---|---|---|---|
| 4,084,579 | 4/1978 | Yu | 126/659 |
| 4,098,261 | 7/1978 | Watt | 126/661 |
| 4,120,284 | 10/1978 | Cotsworth | 126/659 |
| 4,164,935 | 8/1979 | Marles et al. | 126/659 |
| 4,624,242 | 11/1986 | McCall | 126/659 |
| 5,074,282 | 12/1991 | Reed | 126/659 |

FOREIGN PATENT DOCUMENTS

| | | | |
|---|---|---|---|
| 2443651 | 7/1980 | France | 126/659 |

Primary Examiner—James C. Yeung
Attorney, Agent, or Firm—Richard R. Mybeck; Peter B. Scull

[57] ABSTRACT

A solar energy collector expansion assembly including means for reducing having axial thermal expansion in the riser tube is described in which each riser tube has a pair of solar collecting panels attached thereto by a removable elongated "C"-shaped connection member. The "C"-shaped connection member is deliberately made from a material having a higher coefficient of thermal expansion than does the material from which the solar collecting panel and the riser tube are formed thereby influencing the dimensional thermal expansion of the riser tube-connection member assembly into a radial rather than axial direction thereby reducing the weakening and failure of the bonds which join the riser tube to adjoining members. Each riser tube-connection member assembly is curved slightly from linear into a cambered shape to further influence the path of thermal expansion of the assembly from a direction other than axial.

20 Claims, 1 Drawing Sheet

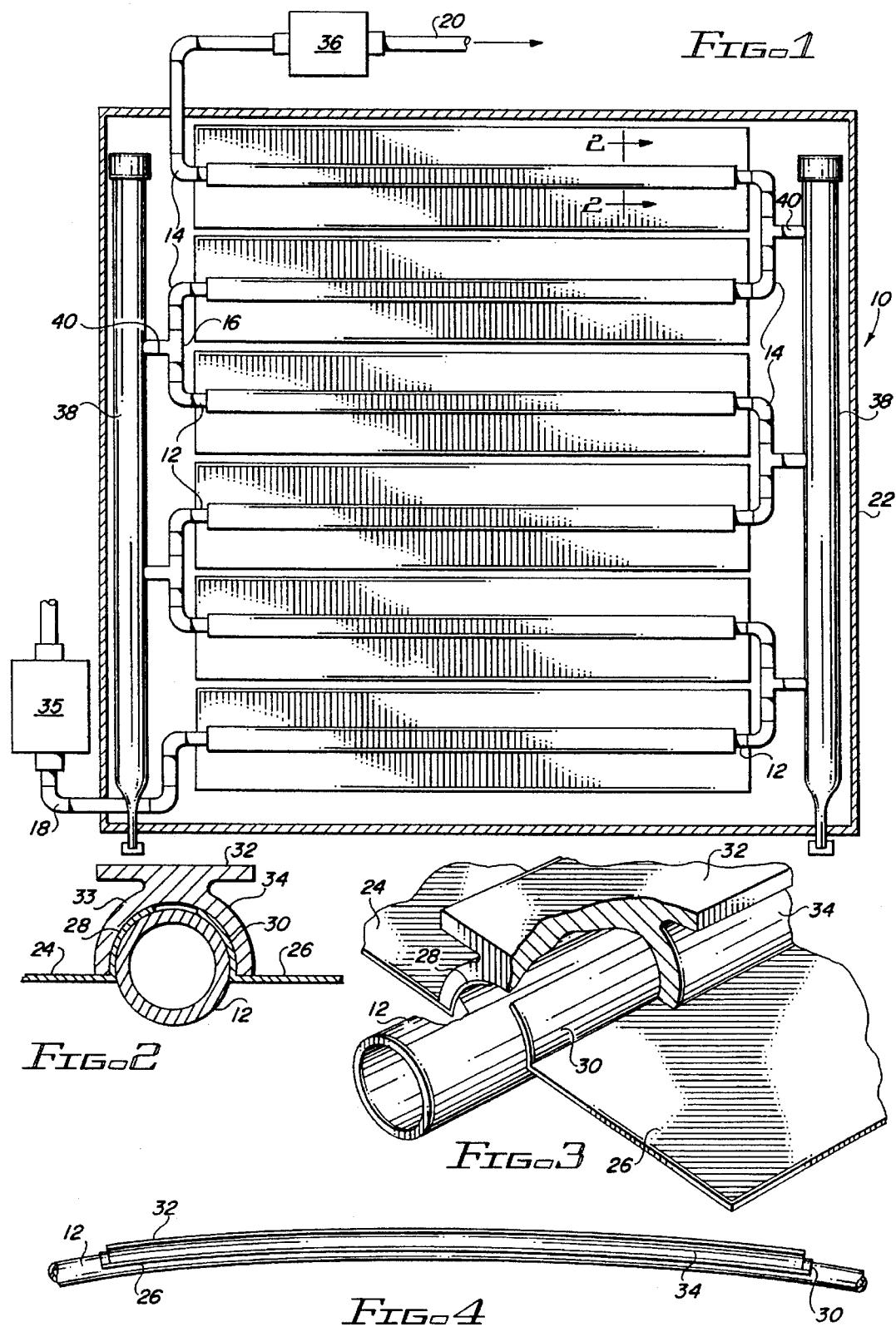

SOLAR COLLECTOR EXPANSION ASSEMBLY

INTRODUCTION

The present invention relates generally to solar energy collectors, and more particularly to a new and improved solar panel expansion assembly including unique means for compressively attaching solar energy collector panels to solar panel riser tubes in such a way that the compressive and tensile stresses, heretofore associated with cyclical heating and cooling which thereby caused leakage and failure, are substantially eliminated.

BACKGROUND OF THIS INVENTION

As is well known, solar energy collectors operate by absorbing heat from the sun into water or other suitable fluid flowing through the collector. Primarily, the fluid is heated by circulating it through an array of thermally conductive pipes which are directly exposed to the sun's radiant energy. The fluid to be heated first flows into the array from a standard source, is heated while passing through the array, and is thereafter collected for subsequent harvesting of the contained heat in accordance with standard solar energy methodology. A common use of such solar collectors is to heat water supplies for residential, commercial and/or industrial hot water consumption.

The various major elements of solar water heaters comprise the absorber, i.e. that portion of the heater which directly receives the sun's rays and transfers the received heat energy to water or other fluids running through connected pipes or risers; the collector, i.e., the structure encapsulating the absorber in an insulated box-like frame with a transparent top; and the water storage tank usually distant from the collector.

There are presently two basic types of solar water heaters; namely, the open loop and the closed loop systems. In the closed loop system, water or antifreeze or other suitable fluid is continuously circulated between a solar energy collector usually disposed on a building roof and a heat exchanger which is disposed in operative association with a water storage tank, usually inside the building. The water to be heated for residential or commercial use is brought into thermal contact with the heat exchanger and receives heat energy from the continuously circulating medium which has been previously passed through the solar collector on the building roof.

In the open loop system, the actual water to be used is circulated through the solar collector and thereafter may then be blended with unheated water to attain a desired temperature balance and thereafter distributed as hot water to its point of use. Either system may temporarily store heated water in a storage tank which is disposed in line with the building water supply. The present invention is useful with either an open or a closed loop system.

Construction of the absorber as generally practiced involves forming a series of parallel semi-circular grooves in a piece of flat sheet metal, such as sheet copper, and then placing individual cross-runs or risers of copper pipe into these semi-circular grooves. The pipes were physically soldered to the sheet metal. Generally the sheet metal was rectangular in shape, being 3 to 4 feet in height and 8 to 10 feet in panel or sheet of the metal. The panel, when installed, was aligned longways, i.e., one of the length sides resting upon the roof oriented to face the sun, sloped at an angel to the horizon, and painted black to more efficiently absorb the sun's rays. The copper pipes were usually on the underside (away from the sun) of the absorber panel.

More specifically however, the present invention is directed toward the improvement of those solar collectors which comprise a plurality of parallel, elongated riser tubes connected to each other at their respective ends with elbow or tee joints using standard soldering or welding techniques and arranged in heat conductive relationship with radiation-receiving collector panels. Elbow joints connect the riser tubes in a serpentine fashion and the water travels serially through the several riser tubes, reversing directions as it flows through adjacent tubes. Tee joints, on the other hand, are used for manifold-type collectors in which the water is introduced into an inlet manifold operatively connected to all of the riser tubes. Water or other heat transfer medium is caused to flow into a manifold-type collector and then passed in parallel paths simultaneously through all of the riser tubes to a discharge manifold positioned on the opposite end of the collector. The heated water is then drawn from the second manifold for storage and/or use.

In both systems, thermally conductive, pliable, and usually metallic sheets or panels which receive and absorb the energy from the sun in the form of heat are mounted between and connected to all of the elongated riser tubes. This solar heat is then conductively transferred from the collector panels to the riser tubes and hence to the fluid medium flowing therethrough. In use, these systems and their interconnected assembly of collector plates and riser tubes gave rise to a number of leaks and cracks which occurred from the repeated longitudinal expansion/contraction of the riser tubes relative to the associated elbows/manifolds.

As described in Reed, U.S. Pat. No. 5,074,282, these types of solar collectors were originally formed from a single, large panel of sheet metal, approximately 8 to 10 feet long by 3 to 4 feet wide, which was arrayed with multiple riser tubes running along the length of the panel and disposed in spaced generally parallel relationship to each other. Copper was the material of choice for both the riser tubes and the panel. Semicircular grooves were formed in the panel to receive the riser tubes in an effort to create good thermal contact therebetween on the theory that the greater the area of actual surface-to-surface contact, the more efficient the heat exchange. To effect a secure thermal contact between the riser tubes and the panel, the riser tubes were frequently soldered or welded directly to the panel.

However, thermal expansion problems were also encountered with these prior devices. Thus, when the device was placed in the sun, the solar collector not only absorbed heat for transfer to the fluid medium, the heat also caused the panels and riser tubes to expand. The expansion problem was particularly vexatious because the panel and the riser tubes were generally of different thicknesses and, even when made of the same material, expanded at different rates causing stress upon and eventually rupturing the bond between the panel and the riser tubes. Once the bond was broken, the thermal conduction between the panel and the associated riser tubes was no longer efficient and, frequently, was ineffective.

In order to overcome this problem, the prior art made several attempts to develop alternative means for connecting the riser tubes to the solar collector panels. For example, several describe the use of a plurality of spring or elastic clips placed at a plurality of locations along the length of a riser tube to secure the collector panel attached thereto. (See: for example, Marles et al., U.S. Pat. No. 4,164,935; Sorenson et al., U.S. Pat. No. 4,094,301; and Ligier, France, Publication No. 2530788). These proposed solutions generally involved very short clips and required the use of many clips which were placed in spaced generally parallel relationship to each other along the axial length of a riser tube. As disclosed, the clips did not cover the complete contact length between the riser tube and the collector panel and therefore did not maximize the heat conductivity therebetween. Further, the materials used for these various clips was not specifically named in all these references, although Marles did teach that cadmium-plated steel was the material of choice. Further, these references abandoned the single large collector panels theretofore commonplace and taught the use of a plurality of smaller panels intermediate of and connected to each riser tube.

In another prior art teaching, seeking to enhance the heat exchange relationship of the solar panel to the riser tubes, Cotsworth et al., U.S. Pat. No. 4,120,284, discloses a C-shaped resilient metal clip. The mouth of this clip is made to spring outward as it is pressed onto the riser tube and then resiliently return to normal after circumscribing the tube. In practice, the collector panel is first wrapped around the riser tube and then is secured thereto in heat conducting relationship therewith by the application of the clips. Cotsworth suggests that a plurality of clips may be disposed along the axial length of each riser tube in spaced relationship to each other, or, alternatively, a single elongated clip may be employed to engage the collector sheet over the full length of the riser tube. This clip is designed for use with a single collector panel curved around several riser tubes. The clips are made from a resilient metal.

Finally, McCall, U.S. Pat. No. 4,624,242, teaches a connecting member, preferably formed of extruded aluminum, for receiving conduits partially wrapped with thin metal heat exchange fins or panels, preferably aluminum. The connecting members have two oppositely facing conduit receiving portions and are formed so inner diameter (I.D.) of the conduit receiving portion conforms to the outside diameter (O.D.) of the conduit received therewithin. The connection is made by a thin metal panel between a conduit and a connecting member. The conduit is then forced or pressed into the connecting member and the thin metal panel is sandwiched therebetween around the conduit to conform to the curvatures of the conduit and the connecting member. In this way, the thin metal sheet and the conduit are securely held inside the connecting members in thermal conducting relationship.

While most of the cited references suggest the use of thermally conductive materials, such as copper and aluminum, for the riser tubes, none recognized the existence of the major problem created by the cyclic elongation and retraction of the riser tubes upon their end connections and the ruptures and leaks which resulted. It is toward the solution of that problem that the present invention is directed.

The present invention thus involves the utilization of cambered shapes of and the use of connection members and riser tubing deliberately made from materials having different relative thermal expansion properties that coact to eliminate the compressive and tensile stresses which heretofore caused failure and leakage when the uncontrolled thermal expansion and contraction of the tube, caused the fluid connectors to fail.

BRIEF SUMMARY OF THE INVENTION

The present invention relates generally to solar energy collectors, and more particularly to novel means and methods of creating such collectors wherein the interaction of an elongated discrete precambered "C"-shaped aluminum connection member with copper riser tubes and interconnecting copper solar energy collecting panels is controlled and the deleterious axial expansion and contraction of those tubes against their associated end-connecting and/or tee members is substantially reduced.

In a preferred practice of the present invention, elongated sheets of copper are preformed on a longitudinal edge thereof to create a semicircular flange. The semicircular flange of each of two adjacent solar collecting panels are then seated upon a riser tube interposed therebetween. A "C"-shaped, elongated connection member, having an inside diameter substantially the same as the outside diameter of the riser tube, is then snapped or press-fit over the flanges and onto the tube to compressively hold the panels in heat conductive engagement with the riser tube. Two such panels are thus connected to each riser tube and extend outwardly therefrom in a flat co-planar relationship to each other. When placed in solar collecting relationship to the sun, the connection member is disposed above the collector panels and is exposed to the direct sun. Each riser tube and the associated connection member is deliberately arched or curved to impart a camber thereto as shown in FIG. 4. The camber is formed simultaneously with the insertion of the riser tube into the connection member.

The scientific principles underlying the present invention are believed to involve both the difference in axial thermal expansion between a straight and a cambered member, as well as the physical interaction between preselected materials having different coefficients of thermal expansion. As will appear, the preferred embodiment comprises slightly arched riser tubes and collector connection members which thereby enables greater thermal expansion of the riser tubes to occur in a radial direction rather than along the riser tube axis. The benefit is especially obtained when the connection members are formed of aluminum, which has an inherently larger coefficient of thermal expansion than does the copper from which the riser tubes are formed. The heating of aluminum and copper when configured as described has the unexpected yet desirable effect of reducing the axial expansion of the riser tube assembly and thereby also reducing the corresponding stresses on the welded or other bonds of the various tubing members. Reducing these stresses decreases the weakening and failure of the welded bonds and thereby decreases the need for repair and replacement of leaks and ruptures thereby substantially reducing maintenance cost.

Accordingly, a principal object of the present invention is to provide a new and improved solar energy collector fabricated from materials having different coefficients of thermal expansion whereupon the axial thermal lengthening of the collector tubing is substantially reduced.

Another object of the present invention is to provide a new and improved solar energy collector in which the stresses which heretofore occurred at the riser tube to elbow or tee joint connections in response to the thermal expansion of the riser tubes are substantially reduced.

A still further object of the present invention is to provide a new and improved solar energy collector in which the stresses on welded or other tubing bonds are substantially reduced by preforming the riser tubes into a slight curve which controls the axial expansion of those tubes when in operation.

These and still further objects as shall hereinafter appear are readily fulfilled by the present invention in a remarkably unexpected manner as will be readily discerned from the following detailed description of an exemplary embodiment thereof especially when read in conjunction with the accompanying drawings in which like parts bear like numerals throughout the several views.

BRIEF DESCRIPTION OF THE DRAWINGS

In the Drawings:

FIG. 1 is a plan view of a solar energy collector embodying the present invention.

FIG. 2 is a cross-sectional view taken on line 2—2 of FIG. 1.

FIG. 3 is a fragmented, partial cut-away, view of an end portion of a riser tube connection member assembly of the solar energy collector of FIG. 1; and FIG. 4 is a side, partially fragmented view of a riser tube-connection member assembly of the solar energy collector of FIG. 1 illustrating the camber imparted thereto.

DESCRIPTION OF THE PREFERRED EMBODIMENT

The present invention relates generally to a solar energy collector of the type shown in FIG. 1 and identified by the general reference 10.

More particularly, collector 10 comprises a plurality of riser tubes 12 disposed in generally parallel relationship to each other and interconnected by a plurality of elbow connectors 14 secured one at each end of each tube 12 and oriented so that when adjacent elbow connectors 14 are joined to intermediate connector 16, a serial flow of fluid is obtained from fluid input source 18 through the several riser tubes 12 in sequence for discharge through fluid output 20 disposed at the opposite end of collector 10. The entire array of riser tubes is installed within a collector frame 22. A plurality of thin solar collector panels are mounted in frame 22 to provide a first panel 24 and a second panel 26 in operative association with each riser tube 12 as shown in FIGS. 2 and 3.

More particularly, each solar panel, such as panel 24, as shown in FIGS. 2 and 3, is provided with an curvilinear channel 28 on the edge adjacent riser tube 12 and adapted to overlay approximately one-fourth of the perimeter of tube 12. Adjacent panel 26 has a similar channel 30 formed on an edge thereof which likewise overlays another different one-fourth of the perimeter of riser tube 12 so that, as shown in FIG. 2, approximately one-half of the perimeter of tube 12 is overlaid by arcuate channels 28, 30 which in turn are secured in place by overlying clamp means 32 in a manner to be hereinafter more fully described.

As shown in FIG. 1, the plurality of riser tubes 12 are disposed in spaced generally parallel relationship to each other and between a pair of elbow connectors 14 attached at each end thereof and oriented to provide serial flow through the several tubes 12. Of course, joint members such as tee joints (not shown) can be employed to connect riser tubes 12 in a manifold-type parallel flow solar energy collector. Riser tubes 12 are connected to each elbow joint 14 as by soldering welding or like standard techniques.

Solar energy collector 10 is attached at its input end 18, to a standard source 35 for water or other suitable fluids. Water, for example, may be input from conventional public water supply lines, household wells and the like. Output end 20 may be connected to standard thermal storage units 36 or piped directly to a residential or commercial supply line (not shown).

As further shown in FIG. 1, freeze expansion pipes 38 are mounted outboard of the array of riser tubes 12 and are connected to adjacent pairs thereof by means of a bridge pipe 40 which extends between expansion pipe 38 and an adjacent intermediate connector 16 which, as previously described, is operatively interposed between adjacent elbow connectors 14 and in fluid communication therewith. Alternatively, intermediate connector 16 and bridge pipe 40 can be formed as a unitary structure such as a "T" junction (not shown).

In practice, bridge pipe 40, or the corresponding portion of the T-junction, will contain a freeze plug or like means which will pop to protect collector 10 from freeze damage in the manner described in detail in my U.S. Pat. No. 5,074,282.

As shown in FIGS. 2 and 3, collector 10 further includes an elongated, somewhat elastic, "C"-shaped connecting or clamp member 32, the flange portions 33, 34 of which holds channels 28, 30 in snug, thermally conductive contact with riser tube 12. This contact is maintained by the pressure imposed by connection member 32 toward riser tube 16 and against the arcuate flange portions 28, 30 interposed therebetween. In order to achieve the proper contact pressure, the inner diameter (I.D.) of connection member 32 must be substantially the same as or slightly less than the outside diameter (O.D.) of riser tube 12. Any spacing shown occurring between riser tube 12, semi-circular flanges 28, 30 and connection member 32 in the drawing is merely for clarity of illustration as there is no gap between these intimately touching components. In operation, connection member 32 also serves as a convection shield and inhibits rapid heat loss of riser tube 12 when the fluid therein is in a static position.

Riser tube 12 and collector panels 24, 26 are preferably made of a highly thermally conductive material such as copper while the connection member 32 is deliberately formed of a material having a larger coefficient of thermal expansion than that employed for riser tubes 12 and panels 24, 26. In a preferred practice, connection member 32 will be formed of aluminum, and panels 24, 26 and riser tube 12 will be formed of copper. Representative values for the average coefficients of linear expansion for copper and aluminum are:

| | |
|---|---|
| Aluminum | $23 \times 10^{-6}/°C.$ |
| Copper | $17 \times 10^{-6}/°C.$ |

See D. Halliday and R. Resnick, Fundamentals of Physics, $2^{nd}$ Ed., 348 (1981).

The critical interaction between "C"-shaped connection member 32 with a riser tube 12 occurs as follows. When solar collector 10 is placed in operational position relative to the sun, with connection member 32 toward the sun collector 10 receives and absorbs the sun's radiant energy. This energy heats the thermally conductive collector panels 24, 26 which in turn transfers heat into riser tubes 12. This heat transfer, while primarily used to heat the fluid medium circulating through the several riser tubes 12, also is known to cause an undesirable axial expansion of the tubes 12. This thermal expansion is undesirable because the longitudinal expansion of the tube in response thereto, if uncontrolled, places stress on the welded bonds between tubes 12 and elbow connectors 14 to weaken and often those bonds to weaken and often fail, particularly because they are constantly subject to compressive and tensile stresses caused by the alternate expansion in sunlight and contraction (at night) of riser tubes 12.

Elongated "C"-shaped connection member 32, which are made from aluminum as herein described, has a higher coefficient of thermal expansion than that of the copper riser tubes 12, and therefore counteracts these stresses and causes the connection member-tube assembly to arc rather than elongate. Specifically, the sun's radiant energy originally absorbed in solar collecting panels 24, 26 is thermally conducted to riser tubes 12 and into the fluid transported inside riser tubes 12, while connection members 32 are likewise absorbing heat and, upon heating, thermally expand. However, because of the camber imparted to the assembly as shown in FIG. 4 and because connection member 32 has higher thermal expansion properties than does the riser tube 12, connection member 32 expands at a greater rate than does riser tube 12 and in so doing, alters the three-dimensional expansion of the connection member-tube assembly by lessening the axial expansion of the tubes 12 and enhancing movement in a transverse or radial direction throughout the length of each riser tube 12.

Another important feature of the present invention, alluded to above, which contributes to reducing the bond stresses caused by axial thermal expansion involves the longitudinal profile of the riser tube-connection member assembly. As shown in FIG. 4, the assemblage of riser tube 12 having connection member 32 attached thereto is provided with slight camber or bend along its longitudinal axis. This slight bend of what was previously a straight assembly has the unexpected effect of causing the principle thermal expansion to occur radially rather than axially whereby the stresses previously created in the tube end connectors is substantially reduced to a safe level and has eliminated this joint as a major source of system failure.

As described above, the preferred embodiment of the present invention employs copper riser tubes 12 having copper solar collecting panels 24, 26 secured thereto by aluminum "C"-shaped connection members 32. This attachment is achieved by a snap or press fit of each connection member 32 onto a respective riser tube 12 around which the arcuate flanges 28, 30 of two adjacent panels 24, 26 have been wrapped. Connection member 32 thus effectively binds flanges 28, 30 to riser tube 12.

Connection member 32 is provided with an arcuate inner surface having an interior diameter which is substantially the same as or slightly less than the outside diameter of riser tube 12 which insures a snug force fit for member 32. Furthermore, connection member 32 is fabricated in such a way that the legs or flanges 33, 34 thereof can flex or spring about riser tube 12 during the snap-on procedure while being sufficiently resilient to maintain pressure between each connection member 32 and its associated flanges 28, 30 and tube 12 when operatively installed. In this manner connection member 32 securely holds itself and flanges 28, 30 in tight, close thermally conductive heat exchange contact against riser tube 12. Of course, connection member 12 can be removed to facilitate maintenance and repair of any associated component when necessary.

All other construction procedures are carried out using conventional and well-known techniques. For example, copper riser tubes 12 are preferably welded to their respective elbow connectors 14 (or tee joints, not shown) using standard welding techniques. Further, the box-like collector frame 22 is also preferably made and insulated by methods known in the art. The preferred freeze expansion pipes 38 are made as described in detail in the above-referenced U.S. Pat. No. 5,074,282, which also discloses the construction of an acceptable frame 22. Further, in a preferred practice of the present invention for residential installation, riser tubes 12 will have ⅝ inch outside diameters (O.D.) and with wall thicknesses of about 0.036 inch. Tube 12 usually will be 8 to 10 feet in length. Further, when approximately six riser tubes 12 are incorporated in one array (as shown in FIG. 1), the array will be 3 to 4 feet wide. In practice, connection member 32 and panels 24, 26 will have substantially the same length as riser tube 12, allowing sufficient room, of course, to weld tube 12 to its associated elbow connector 14. Of course, more than one connection member 32 and more than two panels 24, 26 may be used to cover the length of each riser tube 12 when circumstances dictate an extra long riser tube 12. In any event, it is desirable to cover the greatest possible uninterrupted length of riser tube 12 to maximize the thermal conductivity between panels 24, 26 and riser tube 12. Panels 24, 26 will normally have a thickness of approximately 0.008 inch and a width of between 3 and 4 inches (corresponding to the three to four foot wide array using six risers) leaving a sufficient width along one longitudinal edge for forming arcuate flanges 28, 30. A black chrome or other energy absorbing coating may also be applied to the exposed side of panels 24, 26 and riser tubes 12 in order to enhance heat absorption.

As has been disclosed, the principal benefit provided by the means and methods of the present invention is the substantial reduction of the compressive and tensile stresses on the riser tube and connections including the elbow and tee joints by the alternate expansions and contractions when the riser tube is heated by solar energy during the day and cooled at night. These stresses which heretofore caused weakening and failure of the welded fluid connector bonds and led to leakage of the fluid flowing therethrough, are absorbed in a innocuous arcuate path.

The unexpected novel relief of the stresses at the junction of the riser tubes with their associated fluid connector is achieved by the use of "C"-shaped connection members 32 which are cambered and which expand at a greater rate than the riser tube 12 and panels 24, 26 associated therewith. This difference in the relative expansion rates causes riser tubes 12 to expand radially thereby reducing the magnitude of the heretofore damaging axial expansion experienced by solar energy collectors of the prior art. The reduction of axial expansion is further enhanced by providing each riser tube with an arch or camber which reduces its axial expansion.

From the foregoing, it is readily apparent that a new and useful embodiment of the present invention has been herein described and illustrated which fulfills all of the aforestated objects in a remarkably unexpected fashion. It is of course understood that such modifications, alterations, and adaptations as may readily occur to the artisan confronted with this invention are intended within the spirit of this disclosure which is limited only by the scope of the claims appended hereto.

Accordingly, what is claimed is:

1. A solar energy collector comprising:

a base frame;

a plurality of riser tubes made from thermally conductive materials and operatively mounted in said base frame in generally parallel spaced relationship to each other;

a plurality of collector panels, each said panel made from a thermally conductive material and operatively interposed between adjacent riser tubes, each said panel having a curvilinear channel defined on a longitudinal edge thereof for overlaying said riser tube associated therewith; and a plurality of elongated "C"-shaped connection members, each said connection member adapted to press fit over and compressively secure said curvilinear channel of said collector panel to said riser tube in thermally conductive heat exchange relationship thereto, each said elongated "C"-shaped connection member being made from a material having a coefficient of thermal expansion higher than that of said riser tubes.

2. A solar energy collector according to claim 1 in which said riser tubes are made from copper.

3. A solar energy collector according to claim 2 in which said "C"-shaped connection members are made from aluminum.

4. A solar energy collector according to claim 2 in which said collector panels are made from copper.

5. A solar energy collector according to claim 4 in which said "C"-shaped connection members are made from aluminum.

6. A solar energy collector according to claim 1 in which said collector panels are made from copper.

7. A solar energy collector according to claim 6 in which said "C"-shaped connection members are made from aluminum.

8. A solar energy collector according to claim 1 in which said "C"-shaped connection members are made from aluminum.

9. A solar energy collector according to claim 1 in which each of said riser tubes are formed with an arcuate orientation.

10. A solar energy collector according to claim 9 in which each of said elongated "C"-shaped connection members are curved to form the arcuate orientation of said riser tube associated therewith.

11. A solar energy collector as in claim 10 in which each of said connection members and each of said riser tubes are curved into a cambered shape.

12. A solar energy collector comprising a thermally conductive riser tube; an elongated, thermally conductive collecting panel having a semicircular flange formed on a longitudinal edge thereof, said semicircular flange being adapted to engage said riser tube in a thermally conductive relationship therewith; a substantially "C"-shaped connection member press-fit on said riser tube and said semicircular flange of said collecting panel to compressibly hold said semi-circular flange of said collecting panel in thermally conductive engagement with said riser tube, said "C"-shaped connection member having a higher coefficient of thermal expansion than that of said riser tube.

13. A solar energy collector according to claim 12 in which said riser tube is made from copper.

14. A solar energy collector according to claim 12 in which said "C"-shaped connection member is made from aluminum.

15. A solar energy collector comprising a thermally conductive riser tube, said riser tube being arched to present an arcuate shape; an elongated, thermally conductive collecting panel having a semicircular flange formed on a longitudinal edge thereof, said semicircular flange being adapted to engage said riser tube in a thermally conductive relationship therebetween; a substantially "C"-shaped connection member press-fit on said riser tube and said semi-circular flange of said collecting panel to compressibly hold said semicircular flange of said collecting panel in thermally conductive engagement with said riser tube, said "C"-shaped connection member having a higher coefficient of thermal expansion than that of said riser tube.

16. A solar energy collector according to claim 15 in which said elongated "C"-shaped connection member is curved to form said arcuate shape of said riser tube associated therewith.

17. A solar energy collector according to claim 16 in which said connection member and said riser tube are curved into a cambered shape.

18. A solar energy collector according to claim 15 in which said riser tube is made from copper.

19. A solar energy collector according to claim 15 in which said collector panel is made from copper.

20. A solar energy collector according to claim 15 in which said "C"-shaped connection member is made from aluminum.

* * * * *